Jan. 29, 1957
F. F. BRANCH
2,779,028
FLUSH CONTROL UNIT
Filed Feb. 2, 1955
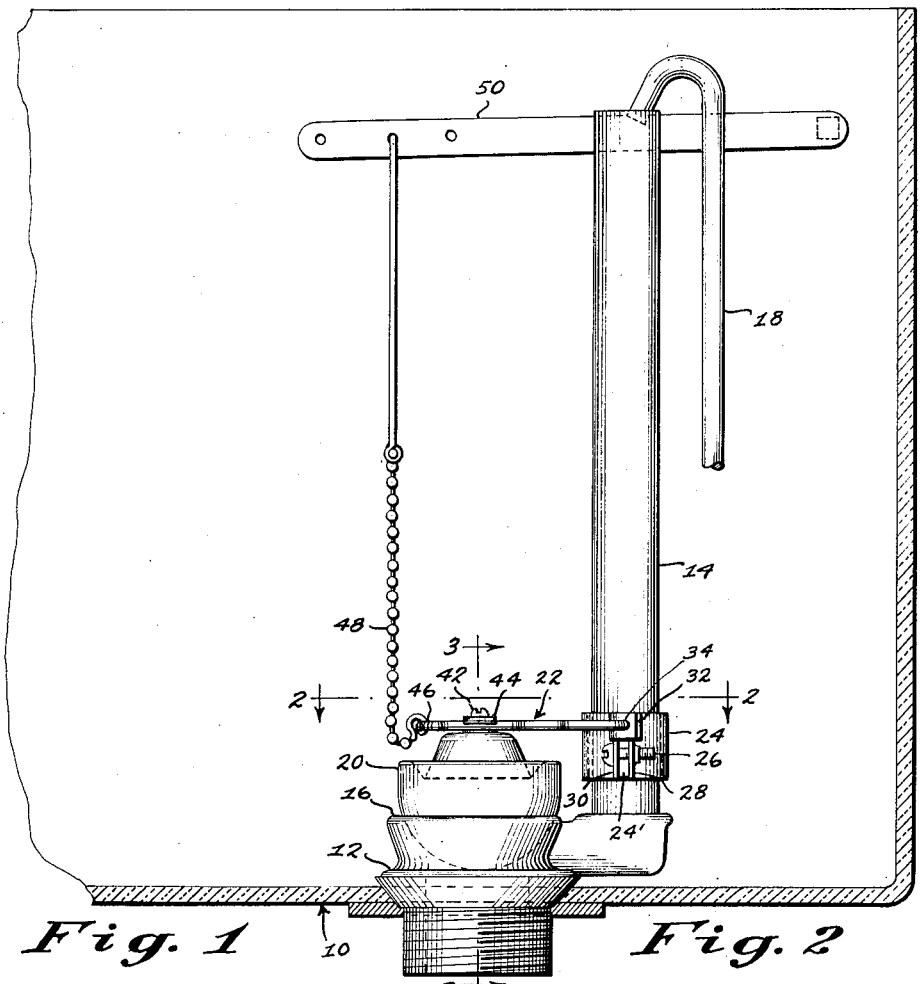
Fig. 1
Fig. 2
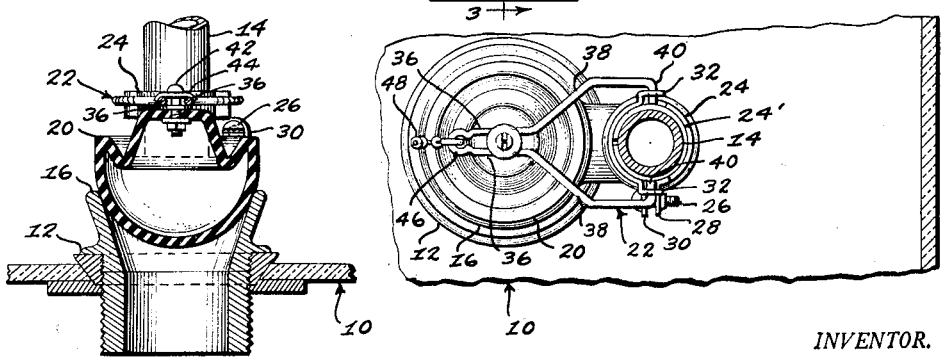
Fig. 3
INVENTOR.
FRANK F. BRANCH
BY
Parrott & Richards
ATTORNEYS United States Patent Office 2,779,028
Patented Jan. 29, 1957

2,779,028

FLUSH CONTROL UNIT

Frank F. Branch, Charlotte, N. C., assignor to Radiator Specialty Company, a corporation of North Carolina Application February 2, 1955, Serial No. 485,706

3 Claims. (Cl. 4—57)

This invention relates to means for operating a toilet flush tank, and more particularly to an exceptionally dependable flush control unit for such tanks.

The flush control unit of the present invention is arranged for use in combination with the usual form of flush tank drain housing having a valve ball seat formed therein and fitted laterally of this seat with an overflow stand pipe, and the unit is characterized by a collar strap formed for clamping about the overflow stand pipe at an adjusted position, and a yoke member pivotally mounted on the collar strap and extending to reach therefrom across the housing seat for carrying and maintaining a valve ball in adjusted relation thereat. Both the collar strap and the yoke member are formed so that they may be installed readily and fixed securely in place after adjustment.

These and other features of the present invention are described in further detail below in connection with the accompanying drawings, in which:

Fig. 1 is a fragmentary sectional detail of a flush tank showing a flush control unit embodying the persent invention installed in place;

Fig. 2 is a sectional detail taken substantially on the line 2—2 in Fig. 1; and

Fig. 3 is a further sectional detail taken substantially on the line 3—3 in Fig. 1.

In the drawings, the reference numeral 10 indicates generally a fragmentary portion of a conventional flush tank having a drain housing 12 installed at the bottom thereof with an overflow stand pipe 14 fitted on the housing 12 laterally of a valve ball seat at 16. The drain housing 12 is of the conventional form allowing overflow through the stand pipe 14 to bypass the valve seat 16, and the usual vent tube (from the water supply valve, not shown) is indicated at 18 arranged to discharge into the upper end of the stand pipe 14.

The valve ball for the flush control unit of the present invention is shown in the drawings at 20 mounted on a yoke member 22 that is in turn pivoted on a collar strap 24 clamped about the overflow stand pipe 14, by means such as a clamp screw 26 arranged to engage oppositely disposed lateral flanges of the collar strap 24 as at 28 and 30.

The collar strap 24 is formed according to the present invention so as to assume a circular form when in clamping position about the stand pipe 14 and thereby afford a complete and secure mounting grip; and, for this purpose, the collar strap 24 is proportioned to fit the largest standard diameter size of stand pipe 14, with one or more spacer sleeves 24' being provided for alternative use with stand pipes 14 of smaller diameter size. The collar strap 24 is further formed with a pair of ears 32 offset outwardly therein at diametrically opposite positions, and with diametrically aligned pivot apertures formed in these ears 32 as at 34.

The yoke member 22 is arranged with a pair of symmetrical leg portions 36 that are joined at one end and extend from this joined end in relatively closely spaced parallel relation for a substantial length and then spread sufficiently, as indicated at 38, to terminate at inwardly angled pivot arm portions 40 fitting the pivot apertures 34 in the collar strap pivot ears 32. The valve ball 20 is mounted at the closely spaced length of the yoke member leg portions 36 by fastening means 42 extended between the leg portions 36 and seated on a clamping washer 44 having opposite downwardly rounded edges, as shown; and by which the yoke member leg portions 36 are not only prevented from spreading upon mounting of the valve ball 20 thereon, but are also held so that yoke member pivot arm portions 40 are maintained in the pivot apertures 34 on the collar strap 24 with the inwardly extending ends of these arm portions 40 abutting the outer surface of the stand pipe 14 (or spacer sleeve 24') to prevent lateral shifting of the mounted valve ball 20. By this arrangement, the collar strap 24 may be clamped at a properly adjusted level on the stand pipe 14 and the valve ball 20 may be adjusted properly lengthwise of the closely spaced yoke member leg portions 36 in relation to the drain housing valve seat 16 so that the valve ball 20 is maintained effectively in proper relation to its seat 16 while remaining readily displaceable therefrom through the pivotal connection of the yoke member 22 with the collar strap 24.

In order to provide for displacement of the valve ball 20 from the seat 16 upon operation of the flush control unit, the yoke member 22 has the leg portions 36 thereof crimped inwardly in relatively closely spaced relation from the joined ends thereof so as to provide an anchoring eye portion 46 at which a lifting chain 48 or the like may be attached for connection to the usual form of operating lever 50. The operating lever 50 is thereby provided with a maximum lifting leverage on the valve ball 20 while the attachment of the lifting chain 48 independently of the mounting means for the valve ball 20 eliminates any tendency for the lifting chain 48 to loosen the valve ball mounting during operation.

The present invention has been described in detail above for purposes of illustration only and is not intended to be limited by this description or otherwise except as defined in the appended claims.

I claim:

1. A flush control unit comprising a collar strap arranged for clamping around a flush tank overflow pipe, said collar strap having a pair of ears offset outwardly therein at diametrically opposite positions with diametrically aligned pivot apertures in said ears, a yoke member formed with a pair of symmetrical leg portions joined at one end and extending adjacent the joined ends thereof in relatively closely spaced parallel relation for a substantial length and then spreading to terminate at inwardly angled pivot arm portions fitting said pivot apertures with the inwardly extending ends thereof abutting said overflow pipe and thereby preventing any lateral shifting of said yoke member, and a valve ball secured at the closely spaced length of said leg portions by fastening means extended between said leg portions and seated on a clamping washer having opposite downwardly rounded edges reaching over said leg portions and thereby preventing said leg portions from spreading.

2. A flush control unit comprising a collar strap arranged for clamping around a flush tank overflow pipe, said collar strap having a pair of ears offset outwardly therein at diametrically opposite positions with diametrically aligned pivot apertures in said ears, a yoke member formed with a pair of symmetrical leg portions joined at one end and extending adjacent the joined ends thereof in relatively closely spaced parallel relation for a substantial length and then spreading to terminate at inwardly angled pivot arm portions fitting said pivot apertures with the inwardly extending ends thereof abutting said overflow pipe and thereby preventing any lateral shifting of said yoke member, and a valve ball secured at the closely spaced length of said leg portions by fastening means extended between said leg portions and seated on a clamping washer having opposite downwardly rounded edges reaching over said leg portions and thereby preventing said leg portions from spreading.

3. A flush control unit for use in combination with a flush tank drain housing having a valve ball seat formed therein and fitted laterally of said seat with an overflow stand pipe, said unit comprising a collar strap arranged for clamping about the full circumference of said overflow stand pipe at an adjusted position, said collar strap having a pair of ears offset outwardly therein at diametrically opposite positions with diametrically aligned pivot apertures formed in said ears, a yoke member formed with a pair of symmetrical leg portions joined at one end and formed at the other ends thereof within inwardly angled pivot arm portions fitting said pivot apertures with the inwardly extending ends thereof abutting said overflow pipe and thereby preventing any lateral shifting of said yoke member, said leg portions extending adjacent the joined ends thereof in relatively closely spaced parallel relation for a length sufficient to reach across said housing valve seat when said arm portions are fitted in said pivot apertures, and said leg portions being crimped inwardly in relatively closely spaced relation from the joined ends thereof for forming an anchoring eye thereat, a valve ball secured at the closely spaced length of said leg portions at an adjusted position in relation to said housing valve seat by fastening means extended between said leg portions and seated on a clamping washer having opposite downwardly rounded edges reaching outwardly over said leg portions and thereby preventing said leg portions from spreading, and a lift chain secured at one end in said anchoring eye.

References Cited in the file of this patent

UNITED STATES PATENTS

| | | |
|---|---|---|
| 1,201,416 | Ziemer | Oct. 17, 1916 |
| 2,142,393 | Halteman | Jan. 3, 1939 |
| 2,190,160 | Mason | Feb. 13, 1940 |
| 2,534,705 | Gertz | Dec. 19, 1950 |
| 2,598,967 | Bennett | June 3, 1952 |
| 2,643,393 | Karr | June 20, 1953 |